United States Patent Office 2,726,582
Patented Dec. 13, 1955

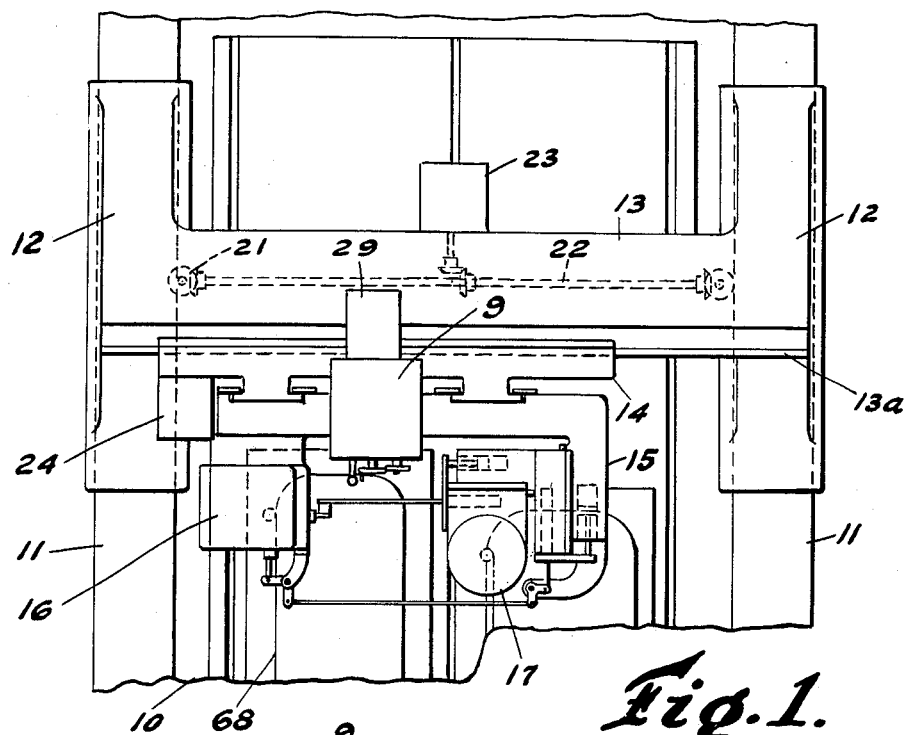

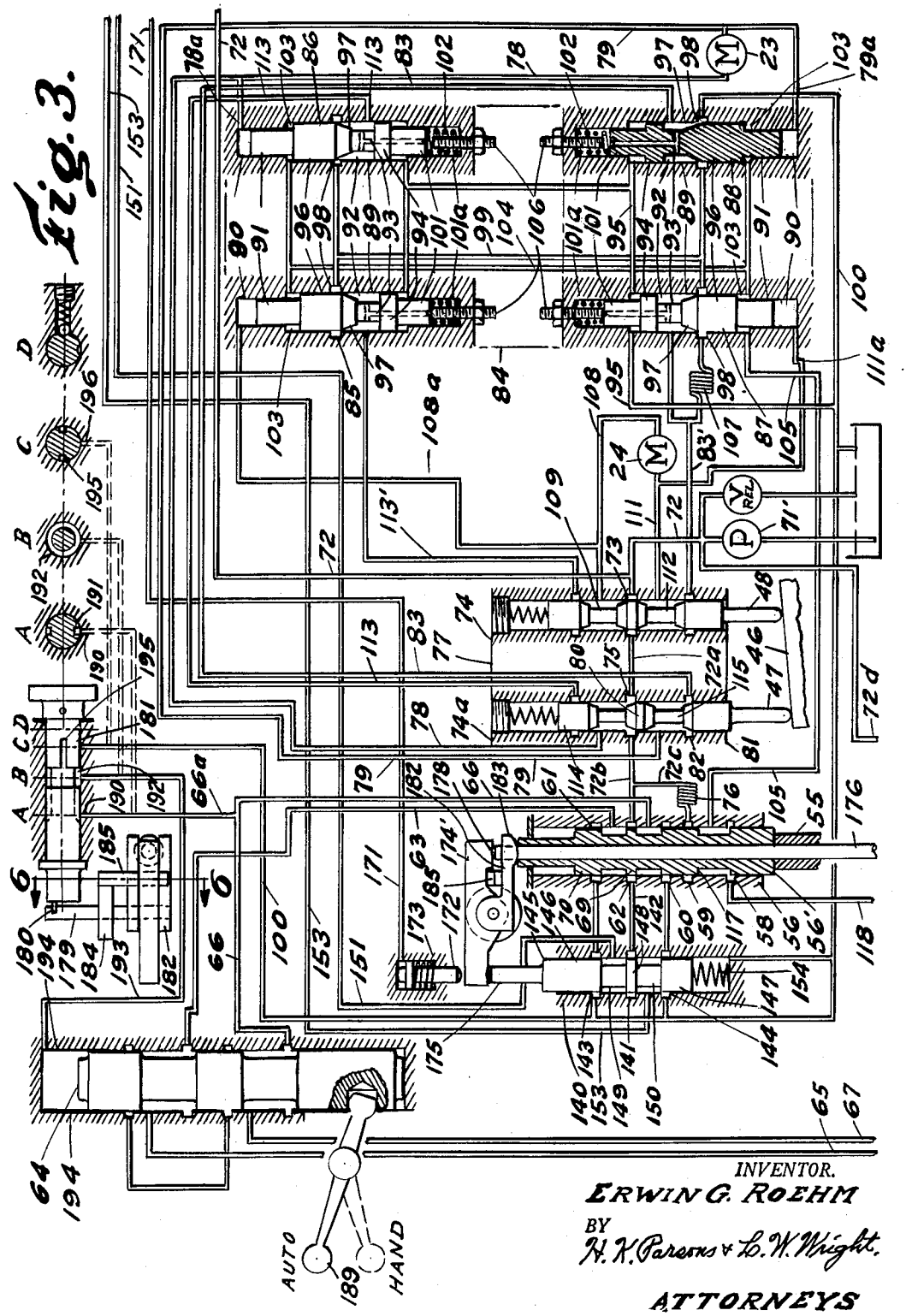

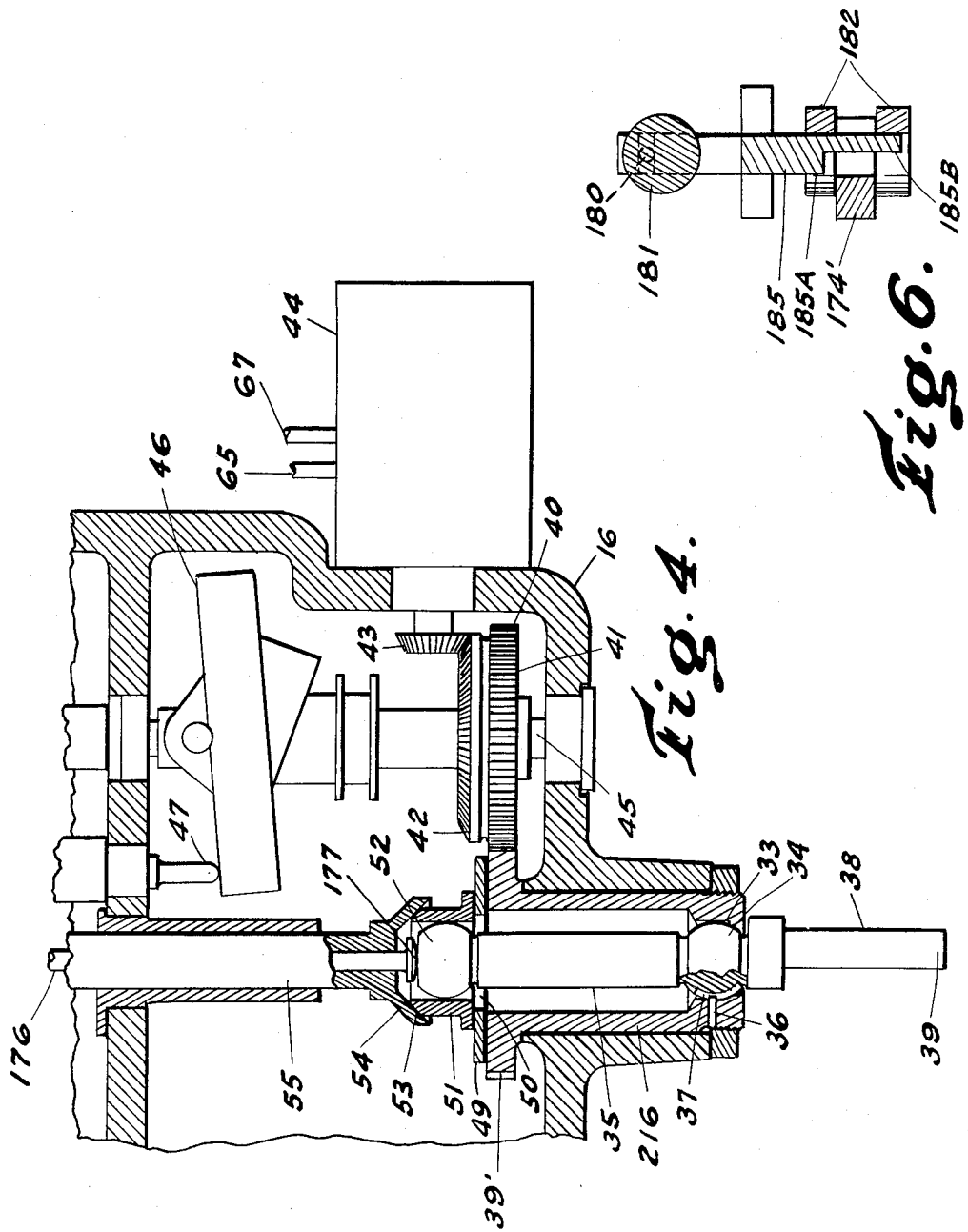

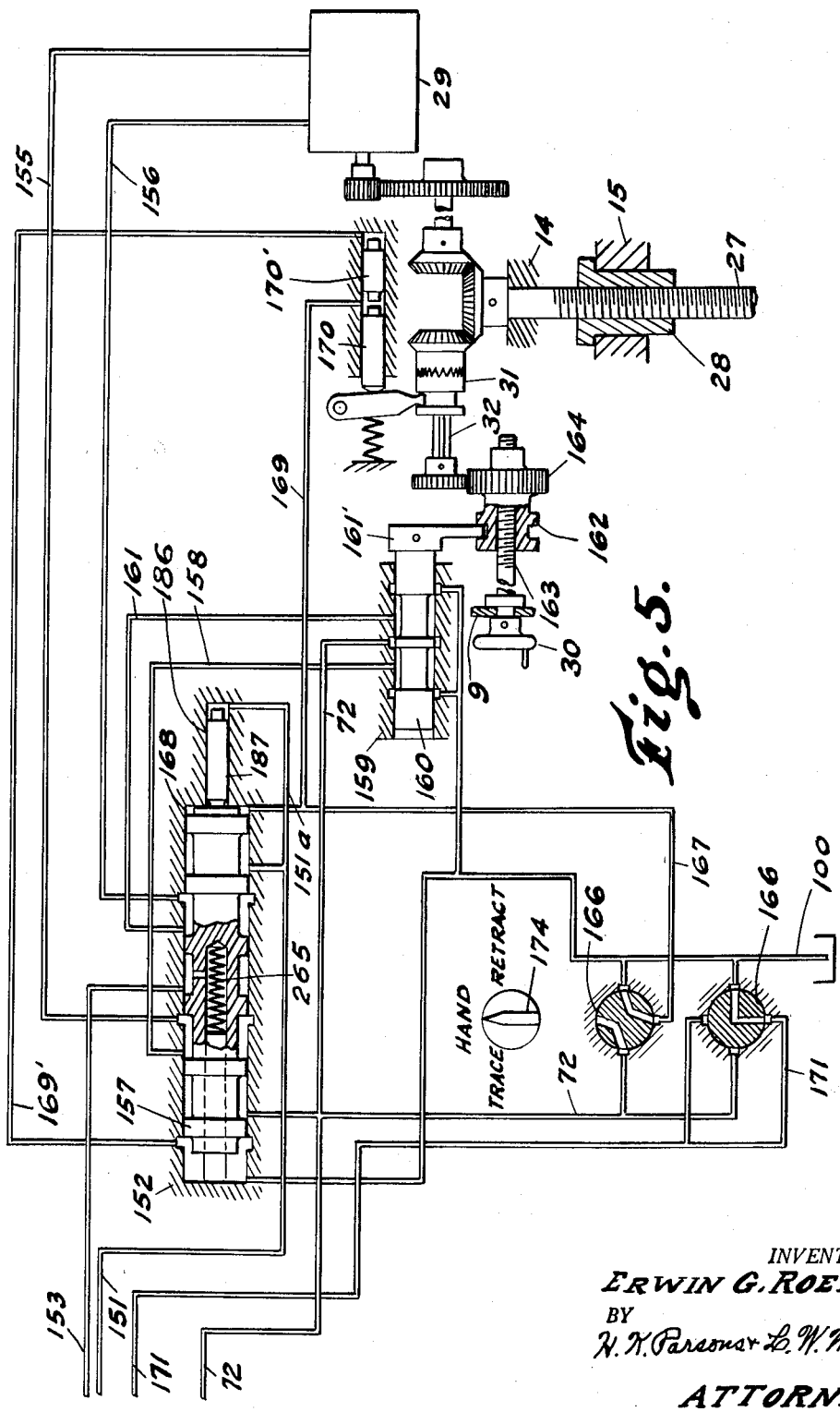

2,726,582
MILLING MACHINE

Erwin G. Roehm, Norwood, Ohio, assignor to The Cincinnati Milling Machine Co., Cincinnati, Ohio, a corporation of Ohio Application May 18, 1953, Serial No. 355,546

9 Claims. (Cl. 90—62)

This invention relates to improvements in milling machines or like machine tools and has particular reference to automatic reproduction machine tools utilized for the performance of profiling, contouring, and similar operations.

One of the principal objects of the present invention is the provision of an improved control mechanism for contouring or profiling machines employing pattern following or tracer devices automatically determining the movements of the machine during the performance of either profiling in a circumferential path or contouring in depth or combined operations in reproduction of the pattern on the work piece and in which the tracer control devices can be either jointly or separately utilized.

A further object of the present invention is the provision of an improved tracer mechanism and associate parts which will positively and accurately control high speed operations of a machine tool.

Another object of the invention is the provision of an improved tracer and associated mechanism automatically to effect an anticipatory slowing down of the rate of relative movement of the cutting tool and the work piece when sharp deviations are to be made in the path of the outline or contour being followed.

An additional object of the present invention is the provision of a unitary tracer control mechanism for machine tools, which mechanism embodies individually effective portions reacting on the hydraulic actuating circuits of the machine to vary the rate of relative movement of work piece and cutter either independently of or in connection with change in the direction of said relative movement.

The invention further contemplates the provision of an improved depth control mechanism in connection with independent actuators and a selector to determine the relative effectiveness of the actuators.

Other objects and advantages of the present invention should be readily apparent by reference to the following specification, considered in conjunction with the accompanying drawings forming a part thereto, and it is to be understood that any modifications may be made in the exact structural details there shown and described, within the scope of the appended claims, without departing from or exceeding the spirit of the invention.

Figure 1 is a plan view of a machine embodying the present invention.

Figure 2 is a front elevation of the machine.

Figure 3 is a diagrammatic view of the main portion of the hydraulic control and operating circuits including the valve mechanisms and associated actuators.

Figure 4 is a sectional view of the tracer mechanism.

Figure 5 is a diagrammatic view of the vertical movement hydraulic control circuits, selector devices and associate parts.

Figure 6 is a transverse section on the line 6—6 of Figure 3.

In the drawings the numeral 10 designates the bed of a machine tool of the milling type provided with ways 11 on which is translatably mounted the column units 12 connected by a bridge 13 having transverse ways 13a for the cross slide 14. Mounted on the cross slide 14 is a vertical slide 15 supporting the tracer head unit 16 and cutter head 17.

The bed 10 is provided with the racks 18 engaged by the pinions 19 on the vertical shafts 20 driven through bevel gearing 21 and transmission shaft 22 actuated by the hydraulic motor 23 for longitudinal translation of the columns. A second hydraulic motor 24 carried by the slide 14 drives pinion 25 meshing with the rack 26 adjacent one of the ways 13a for effecting the transverse movements of the slide 14 on bridge 13. Rotatably supported by the cross slide 14 is the vertical adjustment screw 27 engaged in nut 28 carried by the vertical slide 15 for effecting power raising and lowering of the vertical slide.

A third hydraulic motor 29 effects power actuation of the screw 27 for vertical movement of the slide 15. This motor may be alternatively controlled by the tracer operated valve 145 or by the servo-valve 160 actuated by the hand wheel 30, on axially fixed screw 165 rotatable in panel 9.

The tracer head structure, as shown in Figures 2 and 4, is of the type shown in my co-pending application, Serial No. 315,594. The novel features of the present tracer mechanism and the valving mechanically or hydraulically controlled by movements of said tracer mechanism are particularly illustrated and will be readily understood by joint reference to Figures 3 and 4 of the drawings. As there shown, the tracer head unit 16 rotatably supports the sleeve 216 having a socket at 33 slidably and oscillatably receiving the ball 34 intermediately located on the tubular tracer rod 35. A pin 36 carried by the sleeve 216 rides in an arcuate slot 37 in the ball to permit free vertical and oscillatory movements of the ball while preventing its rotation with respect to the sleeve 216. This is desirable since the present invention is preferably utilized in connection with a tracer finger 38 whose pattern contacting portion 39 is forwardly offset with respect to the axis of rotation of the sleeve 216. This offsetting introduces an anticipatory tracer deflection effect and on change of direction of the outline of the pattern the compensatory rotation of the tracer sleeve will cause an arcuate toward or from movement of the contactor with respect to a depression or eminence on the pattern, compensating for the tilting of the tracer in following the pattern contour quickly to reestablish the tracer in its neutral position.

As is conventional in machines of this type, the rotatably supported tracer sleeve 216 is provided with the gear 39' driven by the spur gear portion 40 of compound gear 41 which has a beveled portion 42 meshing with pinion 43 on the tracer rotation control motor 44. Gear 41 is supported by shaft 45 which is journaled in the tracer head 16 and carries the adjustable rate and direction controlling cam 46 cooperating with the rate and direction control plungers 47 and 48. The details of this cam structure are illustrated in said co-pending application, Serial No. 315,594.

Projecting inwardly from the wall of the tracer head or casing 16 in spaced relation to the gear 39' is the annular rib or plate 49 having a central aperture at 50 circumscribing the upper portion of the tracer sleeve 35. This plate slidably supports the collar 51 whose bore has a sliding fit with the surface of the ball 52 on the upper portion of the tracer rod 35. Collar 51 has a tapered upper end 53 cooperating with the interior of cone 54 on the tubular valve stem 55. Interengagement of these parts is such that any pressure applied to the lower end of the tracer finger will rock the tracer about the ball 34 as a fulcrum, correspondingly oppositely displacing the ball 52 which will carry with it into eccentrically displaced position the collar 51. Upon such movement the upper tapered portion 53 of the collar will exert a camming action against the cone 54 effecting a vertical shifting of the tubular valve stem 56' with reference to the fixed valve bushing 56 carried by the tracer head 16.

The valve bushing 56 is provided with the machine slowdown control groove 58, pressure groove 59, the exhaust grooves 60 and 61 and the main pressure groove 62. Ported into the bushing intermediate the grooves 61 and 62 is a first motor line 63 which in the position of the parts indicated is coupled through valve 64 and conduit 65 to one side of the tracer rotating motor 44. A second motor conduit 66 ported into the bushing between grooves 60 and 62 is coupled by way of valve 64 and conduit 67 with the opposite side of motor 44. These conduits serve alternatively for pressure input and output or reservoir flow connections for motor 44, depending on the positioning of the tracer valve 56'.

As illustrated, the tracer is in a partially deflected position following along the straight portion 63 of a pattern as indicated in Figure 1. In this position, the tracer valve 56' is raised to a point where the valve spool 69 is at a hydraulic neutral producing balanced pressure conditions in the intermediate zones between the spool 69 and spool 70 at the top of the valve and between spool 69 and spool 71 opposing groove 60 in the lower portion of the valve. In this position, a balanced pressure condition will exist in the lines 63 and 66 so that motor 44 will remain stationary. Any unbalance of this condition will cause an increase of pressure in either line 63 or line 66 and a corresponding decrease in the other line to cause motor 44 to rotate in one direction or the other and thus to rotate the tracer head and associate parts, tending to move the tracer contactor 38 to an intermediate or neutral position. It will be understood that during this rotation the control valves 47 and 48 will be suitably relatively adjusted by movement of the cam 46 to effect the directionally corrected relative movement of tracer and pattern and of cutter and work piece.

The prime actuating pressure for the tracer controlled valving and for actual movements of the slide operated motors is supplied by pump 71' through the general pressure conduit line or system 72 which, as shown, is coupled to pressure groove 73 of bushing 74 for valve 48 and by way of the connecting conduit 72a to pressure groove 75 of the bushing portion 74a for valve 47, it being understood that these bushings may be separately mounted or contained within a single valve block 77 according to the convenience of construction and location. From groove 75 an additional pressure conduit 72b connects pressure to groove 62 while branch 72c containing resistance 76 connects the pressure supply system to groove 59. It will be understood that in those instances where the pressure conduits are shown connected by way of bushing grooves that the pressure exists at all times in the several grooves and conduits irrespective of the position of the valves contained within the bushings and the distribution to other points which is controlled by the movement of the valves with respect to the bushings.

As shown in Figure 3, the valve 47 is depressed so that pressure groove 75 is coupled to motor conduit 78 extending to the longitudinal or traverse drive motor 21, while the opposite conduit 79 of the motor is connected through groove 82 to the back pressure or reservoir conduit 83, which extends to a discharge point in the valve block 84 adjacent valve 88. Valve 48 is shown in a central position, blocking forward pressure flow to conduits 108 and 111 for motor 24 and also blocking reservoir conduits 113' and 83'. The valve block 84 has four similar valve chambers receiving the balancing valves 85, 86, 87 and 88. Each chamber includes a valve receiving bore 89 in which one of the valves slides, and a reduced cylinder 90 receiving the piston portion 91 of the valve.

Each has an intermediate return pressure receiving area at 92 opposite a reduced portion 93 of the valve. Each valve has the spool portions 94 and 96 and the block has the drain connection 95 preventing building up of pressure interfering with proper valve operation. The spool 96 has a tapered throttle portion 97 controlling the coupling of the exhaust pressure area 92 with the exhaust groove 98 of the block. The exhaust groove 98 of the various valves are coupled by the common conduit 99 with the general low pressure exhaust or return conduit system 100. The position of the individual valves 85, 86, 87, and 88 regulate and determine the flow from the respective central areas 92 by way of the throttle portions 97 to the return line. Each of these valves is provided with a hollow ported stem portion 101 riding in chamber 101A. The return pressure in chamber 92 reacts through said porting into chamber 101A to urge the valve toward open position in opposition to motor back pressure in chamber 90. Additionally, each bushing has the cylinder or chamber 103 in which the spool 96 slides. The shoulder between 96 and the stem 101 provides a piston responsive to pressure in chamber 103 to move the valve toward closed position, restricting the actual rate of exhaust flow of its controlled motor line irrespective of the flow controlling position or setting of the valves 47 and 48. The control conduit system 104 has branches coupled into the chambers 103 of the several bushings, and is, in turn, connected by the conduit 105 with the bore of the tracer valve bushing 56 intermediate the bushing grooves 58 and 59.

In the position of the rate and direction control valve 47, shown in Figure 3, the pressure in conduit 78 reacts on piston 91 of valve 86 to shift the valve into a closed position against the valve opening reaction of spring 102 while pressure flow into conduit 113 is prevented by the portion 114 of valve 47. All pressure across throttle 80 is therefore utilized for actuation of motor 23. The return pressure conduits 79 of motor 23 are coupled by conduit 79a with chamber 90 of valve 88, initially moving this valve toward closed position against the operation of its spring 102. The return circuit continues through conduit 79 across throttle of valve 47 which will cause a pressure drop as respects the flow into and through conduit 83 so that the pressure created in chamber 92 will be less than the pressure in chamber 90. This latter pressure reacts in chamber 101A, supplementing the action of spring 102 in decreasing the effect of the throttle 97.

The present structure operates for control of the rate of discharge from the exhaust side of the controlled motor 23 and likewise the controlled motor 24 in accordance with the principle that the rate of discharge across a given throttle opening is constant irrespective of the actual pressures involved for a constant pressure drop across the throttle. In the present instance the rate of discharge flow is determined by the sum of the resistance or pressure drop effect created by the throttle 80 in accordance with positioning of the valve 47 and the throttle effect created by the throttle 97 in series with 80. In the operation of the machine a definite position is effected for the valve 47 while the valve 88 as an entirety is self-adjusting. Any increase in the initial motor back pressure in conduit 79—79a ahead of the throttle 80 reacts in chamber 90, tending to close throttle 96, increasing the resistance at this point, this pressure acting against the force of spring 102. Closing of the throttle causes a restriction in the flow through conduit 83 and a building up of pressure, reducing the pressure drop across the throttle 80 and at the same time a building up of the pressure in the chamber 101a to supplement the action of spring 102 until the pressure values of spring 102 and the hydraulic pressure in chamber 101a are greater than the increased motor back pressure in chamber 90, the relation between these pressures determining the position of the throttle 97 to restore and maintain a constant pressure drop across throttle 80 and consequently a constant rate of flow of the motor exhaust fluid in accordance with the setting of the throttle 80.

The same action takes place as respects the individual valves 85, 86 and 87 when the rate valve or valves 47 and 48 are so positioned that the return pressure flow from the motor or motors, 23 and 24 is coupled with one of the individual exhaust flow control valves.

Connected to the groove 59 of the tracer valve bushing 56 through resistance 76 is the pressure conduit 72c. Upward movement of the tracer valve 56' effected by pronounced deflection of transfer will couple conduit 73c, past shoulder 117 of valve 56', by way of conduits 105—104 with the chambers 103. Pressure thus introduced will supplement the pressure in the chambers 90 of the several valves 85, 86, 87, 88, urging all of the valves toward a throttle closing position to slow down or stop the exhaust flow and operation of motors 23 and 24 until, as by rotation of the tracer head, or otherwise, such overdeflection is relieved. The extent of such closing movement of the valves may be limited by suitable setting of the adjustable stops 106, or a bypass resistance 107 to reservoir provided to limit the extent of such throttling action and prevent complete stoppage of slide movements. The detailed structure for exercise of this control is presented in my co-pending application. As here shown, conduit 105 in normal tracing operations is connected to reservoir by conduit 118.

Vertical control

The structure hitherto described is designed particularly for the control of profiling or outlining operations in a single plane. In machines of this type, however, it is frequently desirable that the depth of operation of the tool be simultaneously controlled so that a profile in depth may be simultaneously formed and controlled or a rapid retraction given to the parts in the event that the tracer mechanism contacts a pronounced obstruction. For automatic control of the vertical feed motor 29 there has been provided the valve block 140 having pressure groove 141 coupled to the pressure groove 62 by a conduit 142 and having the return pressure or reservoir grooves 143 and 144 coupled with the reservoir return conduit system 100. Slidable within the block 140 is the vertical movement control valve 145 having the end spools 146 and 147 and the intermediate spool 148. Cannelures or reduced groove portions 149 and 150 intervene respectively spools 148—146 and 148—147. Ported into the block 140 opposite groove 149 is the conduit 151 extending to the valve block 152 while ported into the bushing opposite the valve groove 150 is conduit 153, also coupled to the valve block 152. A spring 154 urges valve 145 upward into a position where the pressure groove 141 is coupled to conduit 153 while exhaust groove 143 is coupled to conduit 151. Movement of this valve into an intermediate position serves to shut off pressure or, alternatively, to create a balanced pressure condition as respects conduits 151 and 153, depending upon the underlap or overlap relation of 141 and 148.

Extending from the block 152 are motor conduits 155 and 156 coupled to the opposite sides of the vertical movement control reversible hydraulic motor 29. The controls for this motor, as shown in Figure 5, are of conventional type. Slidable within the valve block 152 is a control valve 157 which in its left hand position connects conduit 153 with conduit 155 and conduit 151 with 156, placing motor 29 operation under control of valve 145. In its right hand position, as shown, conduit 155 is coupled with conduit 158 extending to valve block 159 of valve 160 while conduit 156 is coupled by conduit 161 to the block 159.

With the parts coupled as shown, the machine is conditioned for hand servo-control. The valve 160, shown in its intermediate position, is provided with shifter 161' engaged in annular groove of nut 162 carried by gear 164. Engaged in the nut is the adjusting screw 163 rotatably supported and held against axial movement by panel 9 and provided with an operating wheel 30 projecting at the front of the machine. Rotation of the screw will move the nut 162, the shifter 161' and valve 160 in one direction or the other to couple pressure conduit 72 selectively with conduits 158 or 161 for reversible actuation of motor 29 to rotate the vertical adjustment screw 27. A feed back extends through clutch 31 and shaft 32 to effect positional restoring rotation of the nut along the screw 163 for continuous counteraction of the effect of rotation of the handle 30. When the clutch 31 is disconnected, as during tracer control of motor 29, the servo is likewise disconnected from the motor conduits 155—156 so that any displacement of valve 160 will be ineffective. In this position the nut and screw may rotate as a unit without displacement of the valve due to the fact that the gearing connection no longer restrains free rotation of the nut.

Normally, the valve 157 is maintained in its right hand position by spring 265 when the selector valve 166 is in the hand control position as shown in Figure 5. When this valve is moved to a tracing position pressure conduit 72 is coupled through the valve to conduit 167 introducing pressure into the cylinder 168 moving the valve 157 into the left hand position and placing motor 29 under control of valve 145. At the same time this pressure reacts through conduit 169 against plunger 170, disconnecting clutch 31.

As shown in Figure 5, the valve 166 comprises a first portion shown in the upper section for controlling the conduit 167 and a second portion shown in the lower section for controlling the conduit 171. In both the hand control position and in the tracing position conduit 171 is coupled to the general reservoir or low pressure conduit system 100 so that there is no actuating pressure against the plunger 172 which is held in elevated position by spring 173. However, when the selector valve control handle 174 is moved to "retract" position the selector valve will be shifted clockwise and will couple pressure to conduit 167, moving valve 157 to the left, completing the circuit from motor 29 to control valve 145 and at the same time pressure will be coupled to conduit 171 projecting plunger 172. The plunger 172, when projected, will engage the intermediately pivoted rock lever 174' having one end resting on the stem 175 of valve 145, moving this valve into its lower position where pressure groove 141 will be coupled to conduit 151 for effecting actuation of motor 29 in a direction to raise or retract the vertical slide for the cutter and tracer. This operation is effected by a hydraulic operation of the depth control valve entirely independent of any tracer reactions on the valve.

In the present construction the depth control valve may be operated by either vertical or angular displacements of the tracer finger or contactor and may be utilized either independently or in conjunction with automatic 360 degree profiling controls. For ordinary control of the depth valve a rod 176 is slidably mounted within the sleeve valve 56' having at its lower end an abutment portion 177 resting on the ball 52 at the upper end of the tracer rod 35 and having at its upper end a rounded portion fitting in the socket 178 of the intermediately pivoted lever 174'. By this construction any vertical movement of the tracer 38 as by pressure on the bottom of the tracer finger will be transmitted through the rod to rock the lever arm 174', thus variably to position the valve 145. There will, however, be no vertical displacement of rod 176 by the ordinary tilting movements of the tracer which shifts valve 56' for control of the tracer rotating motor 44 for determination of directional profiling movements.

The pivot shaft 179 for the lever 174' is longitudinally slidable by eccentric pin 180 carried by rotatable valve 181. This shaft pivotally mounts the abutment arm 182 having a boss 183 for engagement with the upper end of the valve sleeve 56', while secured to the shaft is an arm 184 carrying the stepped spacer finger 185 having a pair of abutment portions 185A and 185B. With the parts positioned as shown in Figure 3, the spacer finger is in its retracted position, permitting an appreciable free movement of the floating abutment arm 182 about its pivot so that the arm 174' will be unaffected by any normal profile controlling movement of the valve sleeve 56'. On pronounced movements effected by excessive upward deflection of the tracer finger 38 the sleeve will move to bring the floating abutment arm solidly against the interposed spacer finger 185 to effect counterclockwise rocking of lever 174', depressing valve 145 to effect a relieving retraction of the vertical slide 15 preventing damage to tracer or cutter.

This safety factor exists whether the machine is conditioned by positioning of the selector valve 166 for automatic or hand vertical movements. Any depression of valve 145 below its neutral position will introduce pressure into line 151 which is coupled by the conduit branch 151a to cylinder 186 containing the piston plunger 187 which reacts against valve 157 to shift same to the left, thus energizing conduit 156 to operate motor 29 for retraction of the vertical slide 15 until the valve shifting pressure against the tracer is released. Movement of valve 157 couples 72 with 169', moving plungers 170—170' to the left. It will be noted that this automatic control is independent of the positive valve setting controls effected by movement of the selector valve and consequent hydraulic reaction against the right hand piston portion of the valve 157 itself. The profiling or 360 degree movements of the machine may be either manually or automatically controlled; in either event by suitable adjustment of the rate and direction determining plungers 47 and 48. Manual operation is effected by the pilot or direction determining wheel 188 shown in Figure 2. In Figure 3 the parts are illustrated in the automatic control position with the valve 64 down. For hand operation the valve is moved upwardly by depressing control lever 189, this action serving to short circuit the motor lines 65, 67 and disconnect them from the tracer control lines 63 and 66.

It will be understood that in utilization of machines of this character it is customary to employ hand controls for effecting initial engagement of tracer and pattern and therefore of cutter and work. On the other hand, to insure accuracy of operation it is preferable that automatic means be employed for disabling or disengaging the hand control upon engagement of the tracer with the pattern in order that accurate tracer determined reproduction may be effected. The valve 181 constitutes a selector for control of automatic engagement as respects the 360 degree profiling operation. In the position of parts illustrated in Figure 3, a branch conduit 66a extends from the tracer valve controlled conduit 66 to a port 190 of the valve 181 where it is connected by groove 191 to the central valve groove 192 coupled by conduit 193 to the cylinder 194 which receives the upper end of valve 64. With this setting of the valve 181, if valve 64 is in hand control position as for initiating operation of the machine, when the pattern contactor 38 engages the pattern and causes a positive deflection of the tracer arm, raising into the positive position the sleeve valve 56', pressure will be coupled from groove 62 into conduit 66. This pressure will react by way of the valve 181 and associate connections introducing pressure into the cylinder 194, automatically to shift valve 64 from hand control to the automatic control position illustrated in which the conduits 63, 66 are coupled with conduits 65, 67 for automatic machining operation.

When it is desired to have automatic depth control only and to accomplish this control by both vertical and tilting movements of the pattern contactor 38, valve 181 is partially rotated. This effects an axial movement of shaft 179, placing a thicker portion or step 185A of the interposed spacing finger 185 between the adjacent portions of the valve controlling lever 174' and the floating abutment member 182.

In this position the parts 174', 182, 185 will move as a unit so that any axial movement of sleeve 55 effected by tilting of the tracer will be transmitted to the depth control valve 145 for constant determination and control of its position as a result of tilting deflections, while at the same time any vertical movement of the rod 176 will independently react against lever 174' for positioning of the valve 145. While both the tilting and vertical movements of the tracer react against the lever 174' it will be evident that these reactions are independent one of the other so that the greater deflection, whether tilting or vertical, will be at all times the controlling factor. In this latter positioning of the valve 181, branch 66a is blocked while conduit 193 is connected by groove 195 to the drain or reservoir connection 196—100. Under these conditions, there is no automatic shift from hand steering to power steering upon tracer deflection so that the contouring movements of the machine may be hand controlled and both the vertical and tilting deflections of the tracer utilized to control the movements in depth only.

What is claimed is:

1. A tracer mechanism for automatic reproducing machines, including a support having a valve receiving bore, a rate and direction motor control valve mounted in the bore, a tracer pivotally mounted on the support having a pattern engaging portion and a valve actuating portion, a depth control valve mounted on the support adjacent the motor control valve, and an abutment on the support having a portion movable into motion transmitting position between said valves, said abutment having a portion of size to transmit tracer effected movements of the motor control valve to the depth control valve when said portion is moved into said motion transmitting position.

2. A tracer mechanism for automatic reproducing machines, including a support having a valve receiving bore, a rate and direction motor control valve mounted in the bore, a tracer pivotally mounted on the support having a pattern engaging portion and a valve actuating portion, a depth control valve mounted on the support adjacent the motor control valve, an abutment on the support having a portion movable into motion transmitting position between said valves, said abutment having a first portion of size to transmit tracer effected movements of the motor control valve to the depth control valve when said portion is moved into said motion transmitting position, said abutment having a second portion of less size than the first portion alternatively movable into position between said valves and effective to transmit pronounced movement only of the motor valve to the depth valve.

3. A tracer mechanism for automatic reproducing machines, including a support having a valve receiving bore, a rate and direction motor control valve mounted in the bore, a tracer pivotally mounted on the support having a pattern engaging portion and a valve actuating portion, a depth control valve mounted on the support adjacent the motor control valve, an abutment on the support having a portion movable into motion transmitting position between said valves, said abutment having a first portion of size to transmit tracer effected movements of the motor control valve to the depth control valve when said portion is moved into said motion transmitting position, said abutment having a second portion of less size than the first portion alternatively movable into position between said valves and effective to transmit pronounced movement only of the motor valve to the depth valve, and a shifter carried by the support and coupled to the abutment for selectively positioning the abutment with respect to the valves.

4. A tracer mechanism for automatic reproducing machines, including a support having a valve receiving bore, a rate motor control valve mounted in the bore for axial sliding movement, an actuator coupled with the valve having a tapered frustro-conical seat, an adjustor mounted on the support for transverse sliding movement, said adjustor having a central bore, and a tracer intermediately pivoted to the support having a pattern contactor at one end and an adjustor shifting portion at the opposite end slidably fitting the bore of the actuator whereby tilting of the tracer about its fulcrum will transversely slide the actuator to effect axial movement of the valve, a depth control circuit including a depth control valve disposed adjacent the rate motor valve, and a spacer finger supported adjacent the rate motor valve having an abutment portion movable into position between said rate and depth valves for transmitting movement of the rate to the depth motor valve control valve.

5. A tracer mechanism for automatic reproducing machines, including a support having a valve receiving bore, a rate motor control valve mounted in the bore for axial sliding movement, an actuator coupled with the valve having a tapered frustro-conical seat, an adjustor mounted on the support for transverse sliding movement, said adjustor having a central bore, and a tracer intermediately pivoted to the support having a pattern contactor at one end and an adjustor shifting portion at the opposite end slidably fitting the bore of the actuator whereby tilting of the tracer about its fulcrum will transversely slide the actuator to effect axial movement of the valve, a depth control circuit including a depth control valve disposed adjacent the rate motor valve, a rock shaft intermediate said valves, a rock lever supported by said shaft, a floating lever carried by the shaft having an abutment overlying the rate valve, and a spacer finger carried by the shaft and having a portion projectable between the rock lever and floating lever, whereby to transmit movement of the rate motor valve by way of the levers and spacer finger to the depth control valve.

6. A tracer mechanism for automatic reproducing machines, including a support having a valve receiving bore, a rate motor control valve mounted in the bore for axial sliding movement, an actuator coupled with the valve having a tapered frustro-conical seat, an adjustor mounted on the support for transverse sliding movement, said adjustor having a central bore, and a tracer intermeditely pivoted to the support having a pattern contactor at one end and an adjustor shifting portion at the opposite end slidably fitting the bore of the actuator whereby tilting of the tracer about its fulcrum will transversely slide the actuator to effect axial movement of the valve, a depth control circuit including a depth control valve disposed adjacent the rate motor valve, and a spacer finger supported adjacent the rate motor valve having an abutment portion movable into position between said rate and depth valves for transmitting movement of the rate motor valve to the depth control valve, and a rod slidable in the rate motor valve and engaging at its opposite ends the tracer and the rock lever to rock the lever on axial movement of the tracer.

7. A tracer mechanism for automatic reproducing machines, including a support having a valve receiving bore, a rate motor control valve mounted in the bore for axial sliding movement, an actuator coupled with the valve having a tapered frusto-conical seat, an adjustor mounted on the support for transverse sliding movement, said adjustor having a central bore, and a tracer intermediately pivoted to the support having a pattern contactor at one end and an adjustor shifting portion at the opposite end slidably fitting the bore of the actuator whereby tilting of the tracer about its fulcrum will transversely slide the actuator to effect axial movement of the valve, a depth control circuit including a depth control valve disposed adjacent the rate motor valve, and a spacer finger supported adjacent the rate motor valve having an abutment portion movable into position between said rate and depth valves for transmitting movement of the rate motor valve to the depth control valve, an oscillatable selector valve, means controlled by oscillation of the valve effective to move the spacer finger into and out of motion transmitting position between the rock lever and floating lever, and an automatic profiling control selector circuit completable by way of the rate motor control valve and said selector valve when the latter is oscillated to position the spaced finger in lever connecting position.

8. A tracer mechanism for automatic reproducing machines, including a support having a valve receiving bore, a rate motor control valve mounted in the bore for axial sliding movement, an actuator coupled with the valve having a tapered frustro-conical seat, and adjustor mounted on the support for transverse sliding movement, said adjustor having a central bore, and a tracer intermediately pivoted to the support having a pattern contactor at one end and an adjustor shifting portion at the opposite end slidably fitting the bore of the actuator whereby tilting of the tracer about its fulcrum will transversely slide the actuator to effect axial movement of the valve, a depth control circuit including a depth control valve disposed adjacent the rate motor valve, and a spacer finger supported adjacent the rate motor valve having an abutment portion movable into position between said rate and depth valves for transmitting movement of the rate motor valve to the depth control valve, said finger having a second abutment portion of less thickness than the first alternatively positionable between said rate motor and depth valves to transmit pronounced movements only of the rate motor to the depth control valve.

9. A tracer mechanism for automatic reproducing machines, including a support having a valve receiving bore, a rate motor control valve mounted in the bore for axial sliding movement, an actuator coupled with the valve having a tapered frustro-conical seat, an adjustor mounted on the support for transverse sliding movement, said adjustor having a central bore, and a tracer intermediately pivoted to the support having a pattern contactor at one end and an adjustor shifting portion at the opposite end slidably fitting the bore of the actuator whereby tilting of the tracer about its fulcrum will transversely slide the actuator to effect axial movement of the valve, a depth control circuit including a depth control valve disposed adjacent the rate motor valve, a rock shaft intermediate said valves, a rock lever supported by said shaft, a floating lever carried by the shaft having an abutment overlying the rate valve, and a spacer finger carried by the shaft and having a portion projectable between the rock lever and floating lever, whereby to transmit movement of the rate motor valve by way of the levers and spacer finger to the depth control valve, said finger having a second abutment portion of less thickness than the first alternatively positionable between said rate motor and depth valves to transmit pronounced movements only of the rate motor to the depth control valve.

References Cited in the file of this patent

UNITED STATES PATENTS

| | | |
|---|---|---|
| 2,332,533 | Roehm | Oct. 26, 1943 |
| 2,622,616 | Humes | Dec. 23, 1952 |